(12) United States Patent
Sudhakar et al.

(10) Patent No.: US 7,577,888 B2
(45) Date of Patent: Aug. 18, 2009

(54) SELF LEARNING SIGNATURES

(75) Inventors: Rajeev Sudhakar, Redmond, WA (US);
Anandha Ganesan, Redmond, WA (US); Ashvin Sanghvi, Sammamish, WA (US); Ilarie Letca, Redmond, WA (US); Thomas Theiner, Redmond, WA (US); Dhananjay M. Mahajan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 541 days.

(21) Appl. No.: 11/344,100

(22) Filed: Feb. 1, 2006

(65) Prior Publication Data

US 2007/0208983 A1    Sep. 6, 2007

(51) Int. Cl.
*G01R 31/28* (2006.01)
(52) U.S. Cl. ....................................................... 714/732

(58) Field of Classification Search ................. 714/732, 714/724, 733, 734, 735, 736, 819, 37, 39, 714/48, 799, 47; 709/224; 716/4
See application file for complete search history.

(56) References Cited

U.S. PATENT DOCUMENTS

| 5,602,761 A | * | 2/1997 | Spoerre et al. | ............... 702/179 |
| 6,182,022 B1 | * | 1/2001 | Mayle et al. | ................. 702/182 |
| 2005/0125710 A1 | * | 6/2005 | Sanghvi | ........................ 714/39 |

* cited by examiner

*Primary Examiner*—Phung M Chung
(74) *Attorney, Agent, or Firm*—Shook, Hardy & Bacon

(57) ABSTRACT

A system and method for monitoring processes corresponding to measurable values based on signatures associated with the measurable values is provided. The signatures can be created based on data from auxiliary data sets or auxiliary data sources. Additional monitoring information can be obtained by collecting dimensional data for the measurable values.

19 Claims, 14 Drawing Sheets

SELF LEARNING SIGNATURES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

With increased use of networked computing devices and systems, it has become necessary to monitor these systems for difficulties since these difficulties can have a far-reaching impact. Monitoring these systems manually in a traditional manner is impractical and in many instances is impossible.

Seasoned experts can listen to the "hum" of an engine or hundreds of machines in a factory and determine if the machines are operating properly. This technique cannot be used effectively with servers or data centers. Analysis of a server or data center requires a subject matter expert who is familiar with the normal ebb and tide of the business cycles and specific effects on the server in question that will enable the expert to make hundreds of measurements before coming up with a conclusion. Performing this analysis manually on hundreds of servers in a data center or across an enterprise would be overly burdensome and probably impossible.

Accordingly, techniques have been developed for monitoring computing systems for abnormalities. For example, one or more parameters in a computing system can be selected for monitoring. The parameters are sampled, and the sampled results can be compared against a fixed threshold. If the fixed threshold is exceeded, the technique identifies an abnormality. Unfortunately, this technique often obtains erroneous results for a variety of reasons, including difficulties in determining an appropriate fixed threshold level and differences between system configurations and usage patterns on different computers. Even expert consultants can have difficulty in monitoring a computer system due to the large volumes of data that can be generated when monitoring even a few parameters.

The start of operation for a new system poses another difficult challenge for conventional monitoring methods. When a new system is activated, no historical data for that system is available to assist with monitoring. Additionally, the characteristics of a properly operating system can change over time, which can lead to problems similar to those encountered when a new system is started.

A technique is needed for automatically providing abnormality detection while avoiding the aforementioned difficulties. The technique should avoid retention of excessive data and should be adaptable to functioning within a variety of environments and processes. The technique should also reduce or minimize the amount of startup time required before abnormality detection can be used on a new or modified system.

SUMMARY

In an embodiment, techniques for determining baseline signatures for measured values corresponding to processes on a system are provided. The baseline signatures can be created using data previously collected on a system, as well as data collected on other systems. After creating the baselines, additional data can be collected for the measured values on the system and used to update the baseline signatures.

In another embodiment, techniques for collecting additional monitoring data associated with a monitored process are provided. When measured values corresponding to a process are collected, dimensional data related to the measured values is also collected. The dimensional data can be aggregated and then queried to provide further information about the measured value. In still another embodiment, the amount of data collected can be increased in response to a trigger event such as a detected abnormality. The increased data collection can include both an increase in the sampling rate for a measured value as well as an increase in the number of measured values being monitored.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

I. Overview

Figure 1A:
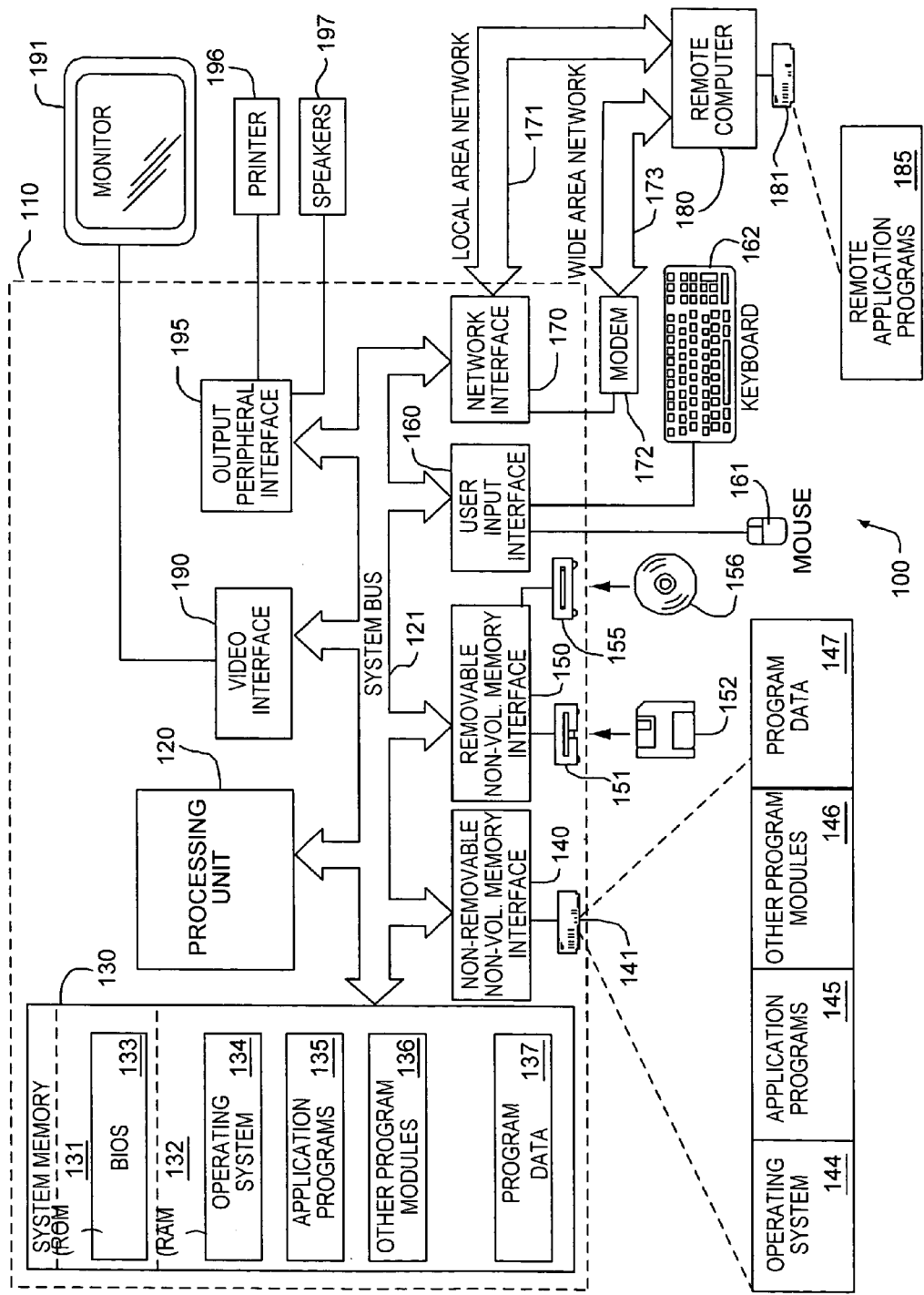
FIG. 1A depicts an exemplary computing environment in which the present invention may be practiced.

In various embodiments, the invention provides automated techniques for detecting abnormalities during a cyclical or other type of processes in order to facilitate system management. In an embodiment, techniques are provided to allow abnormality detection to be started immediately on a system, without having to wait for accumulation of data related to measurable values on the system. In such an embodiment, data for a system that has been previously collected, possibly for other purposes, can be analyzed and used to form a baseline signature. This baseline signature can then be used to begin abnormality detection. One advantage of using a baseline signature based on previously collected data is that the signature can be used immediately for abnormality detection, instead of having to wait for a full business cycle (such as a week) while data is collected to form an initial signature.

Alternatively, a baseline signature can be imported from another computer system. Preferably, the computer system acquiring the imported baseline signature has characteristics that are similar to the computer system providing the baseline. For example, the computer system providing the imported baseline signature preferably has a similar load to the computer system receiving the imported baseline signature.

In still another alternative embodiment, an aggregated signature based on performance data from multiple computers can be formed. This aggregated signature can be used as an baseline signature for abnormality detection. For example, an aggregated signature can be formed over one or more computers that form a cluster. When an additional computer is added to the cluster, the aggregated signature for the cluster can be provided to the additional computer. This once again allows monitoring to begin immediately on the computer joining the cluster, as opposed to waiting for the computer joining the cluster to gather data for a business cycle.

In yet another embodiment, techniques are provided for characterizing a detected abnormality along one or more specified dimensions of the collected data. In such an embodiment, performance and/or event data is collected for various measurable values on a computer system. Additionally, one or more dimensions of transaction specific data are collected for at least one of the measurable values. For example, if the number of sales transactions is a monitored value on a system, additional data can be collected for dimensions such as the type of good or service purchased in the transaction or the location of the store where the sales transaction occurred. The additional collected data dimensions can then be used to further characterize any abnormalities occurring within a system. Also, the additional data dimensions can be used to create signatures focused on a subset of available signature data, such as a signature targeted to a specific type of sales transaction. For example, instead of only having a signature representing all sales transactions, one could create signatures for sales transactions by product type, by store, by customer, or by any other convenient metric.

In still another embodiment, techniques are provided for increasing the resolution of collected data during a detected abnormality. In such an embodiment, the amount of data collected can be increased when an abnormality is detected. The increase in data collection can be due to an increase in the sampling frequency. The increase in data collection can also be due to an increase in the number and/or type of measurable values being monitored. For example, in an embodiment where only disk input and output is being monitored initially, after an abnormality is detected other values could be monitored such as free memory, paging, etc. Increasing the data collection in the vicinity of a detected abnormality allows for better identification of the cause of an abnormality with only a modest increase in the overall amount of collected data.

II. Exemplary Operating Environment

FIG. 1A illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1A, an exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Another example of a computing environment for performing various embodiments of the invention can include a management server and managed nodes or agents that communicate via a network. The management server and managed nodes can each represent, for example, a computer system as shown in FIG. 1A. In this embodiment, the managed nodes represent computer systems where data collection, such as measurement of monitored values, takes place. The managed nodes calculate and maintain signatures for any desired measured values. The managed nodes also compare measured values with signatures in order to determine if an abnormality is present and generate alerts. The collected data, signatures, and alerts can optionally be uploaded to a management server for storage.

III. Signature Creation and Use

Figure 2:
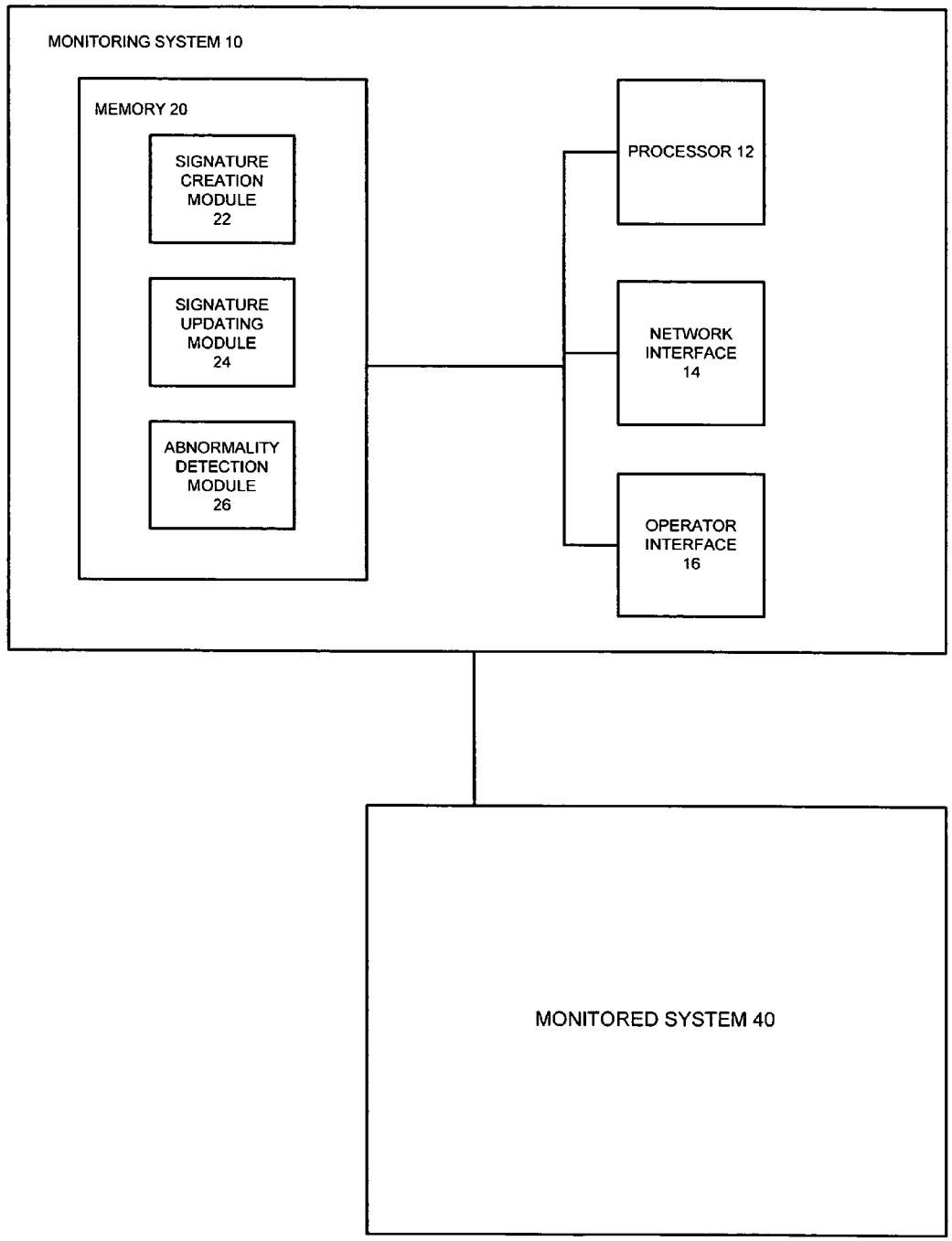
FIG. 2 is a block diagram illustrating components of a system of an embodiment of the invention.

FIG. 2 is a block diagram illustrating components of a system for creating a signature and monitoring computer performance according to an embodiment of the invention. Although monitoring system 10 and monitored system 40 can be separate systems, preferably both monitoring system 10 and monitored system 40 are part of a single computer system, such as a managed node.

A monitoring system 10 is connected with a system 40 for monitoring selected parameters. The monitoring system 10 may include a processor 12, a network interface 14, an operator interface 16 and a memory 20. The processor 12, network interface 14 and memory 20 may be substantially similar to those described above with reference to FIG. 1A. The memory 20 may include a signature creation module 22, a signature updating module 24, and an abnormality detection module 26.

The above-identified components operate to measure a plurality of system related variables. Some of these variables are time variant numeric variables. One variable that might be measured is a usage variable for measuring simultaneous sessions or number of transactions. Usage variables provide an indication of the stress being applied to a system from its consumers. Examples of usage variables include: (1) number of users simultaneously logged on; (2) number of transaction requests per second: (3) rate of request arrivals; (4) packets received per second; and (5) web hits per second. In most production environments, usage follows a business cycle pattern by rising during business hours and dropping off at non-business hours and weekends, etc. The weekly cycle usually has a very consistent pattern. Usually, a usage measure that greatly exceeds or falls below normal is an indicator of trouble or an abnormality.

Another set of system variables relate to utilization. These variables indicate the strain in a system as a result of the stress applied. Examples of these variables include: (1) CPU utilization; (2) queue lengths; (3) task switches per second; (4) memory utilization, etc. Utilization is normally a function of usage and hence also follows business cycles described above. However, these variables cannot be handled identically to usage in all respects. For instance, a sum of queue lengths or CPU utilization across all nodes in a cluster has no meaning. Usually utilization that greatly exceeds or falls below normal is an indicator of trouble or an abnormality.

Another set of system variables includes errors or warnings. In most cases these errors or warnings are a result of mal-function or mis-configuration. Examples of errors or warnings include: (1) malformed requests; (2) parity errors; (3) 404 errors; (4) critical events; (5) logon errors etc. Some errors are "normal". Examples of "normal" errors include: (1) routers dropping packets by design when overloaded; (2) an accepted bit error rate of WANs; (3) pages that give a 404 error due to constantly changing web content; and (4) some portion of the population will mistype username/password when logging on. Hence even errors have a "normal" pattern.

The above-mentioned variables may be measurements of turn around time for service requests. Examples of such services and requests include: (1) ping response times; (2) transaction response times; (3) disk write response times etc. Customers may enter into Operation Level Agreements (OLAs) with the service provider to maintain turn-around-time at an acceptable level. Though response times are related to usage, the relationship is non-linear. Response times also increase rapidly with error rates.

Figure 3:
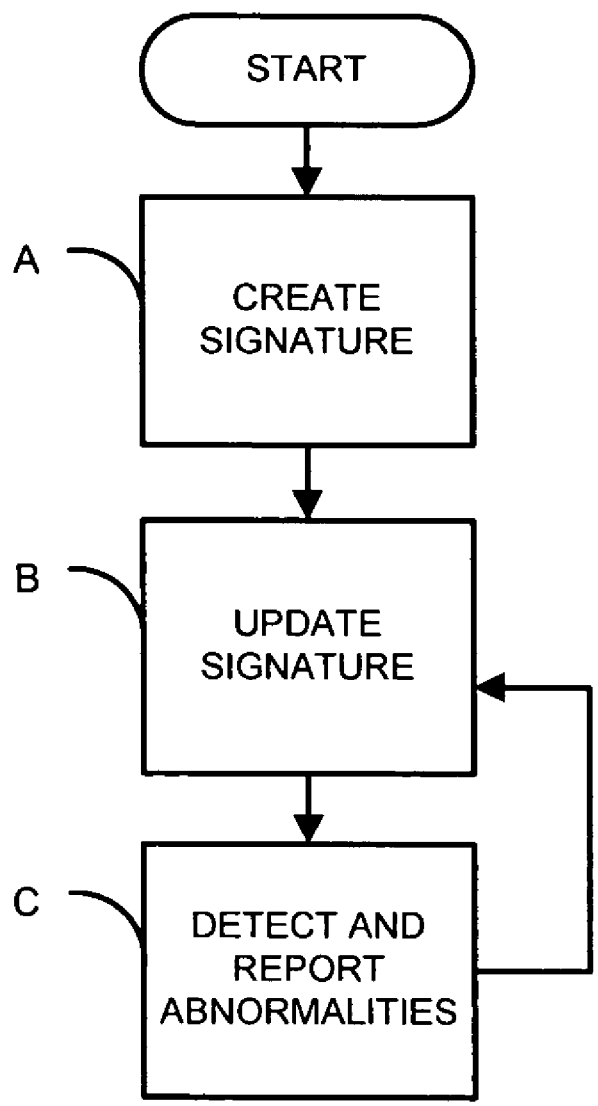
FIG. 3 is a flow chart illustrating a method in accordance with an embodiment of the invention.

FIG. 3 is a flow chart illustrating a method in accordance with an embodiment of the invention. In procedure A, the monitoring system 10 creates a signature. In procedure B, the monitoring system 10 updates the signature. In procedure C, the monitoring system 10 detects and reports abnormalities. In the embodiment shown in FIG. 3, procedure B for updating the signature and procedure C for detecting and/or reporting abnormalities are shown as part of a procedure loop. In alternative embodiments, abnormality detection/reporting and signature updating do not have to be performed together. For example, a signature can be updated without attempting to detect or report abnormalities, or a signature can be used to detect abnormalities without updating the signature.

The above-mentioned signature involves components that make it a more accurate mechanism for detecting abnormalities than the known threshold technique. One component of the signature is the "average" value. One technique for using the average value may involve simply takings samples of all relevant variables and keeping running averages of them. New samples would reveal an abnormality if they are not within a "reasonable range" of this average. However, due to the large differences in average values during peak usage versus off hours, the system uses a more refined concept of the average value in order to achieve the desired accuracy.

The signature will therefore utilize the concept of average by time. The concept of average by time involves sampling variables periodically and calculating averages at various intervals. For example, the monitoring system could sample variables every three minutes, and calculate averages at fifteen-minute intervals for a week. The system would save the information and use it in the signature.

As the system acquires new samples, it calculates their average over fifteen minutes and compares it to the "signature". The comparison enables the system to flag abnormalities. Time sensitive averaging accounts for variability in business cycles.

However, the system additionally should determine a reasonable range around the average in which no abnormality is deemed to have occurred.

Although a constant value might be used for a "reasonable range", use of a constant value may lead to difficulties. For instance, a bank may close at 7 PM daily.

The bank staff performs nightly processing before leaving. Some days may involve larger backlogs compared to others. Hence the processing rate between 7:30-8:00 is very unpredictable. The use of a constant value as a reasonable range may generate a large number of alerts during those erratic times, and raising that number has the effect of losing legitimate discrepancies elsewhere. The constant envelope around the averages is inaccurate for those situations.

Accordingly, the signature uses a standard deviation to measure a reasonable range. The signature uses the standard deviation for every interval and expresses the envelope or reasonable range as a multiple. Accordingly, the envelope or reasonable range is more forgiving around turbulent times during the weekly business cycle, and tighter around normal times. Standard deviation may be expressed as below:

$$\text{Sigma}^2 = 1/N(\text{Summation of } (X_i - X_{avg})^2) \quad (1)$$

where N is the number of samples, $X_i$ is the current measured value and $X_{avg}$ is the calculated average.

In this case, the signature is expressed as an array over every time interval of the business cycle of the average and standard deviation. The envelope may be expressed as $$\text{Envelope} = X_{avg} +/- F*\text{Sigma} \quad (2)$$

where F is tolerance.

Figure 4A:
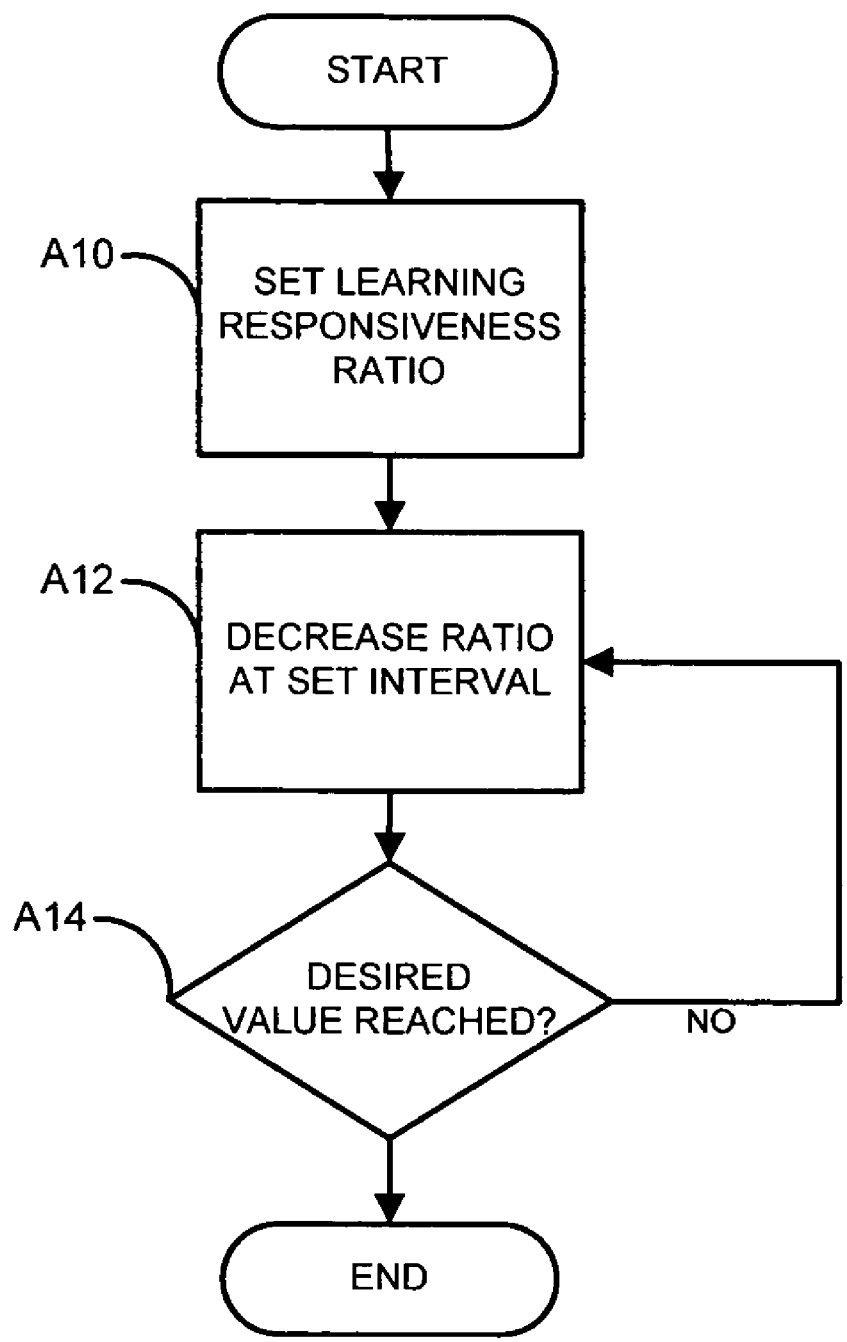
FIG. 4A is a flow chart illustrating a portion of a method for creating a signature in accordance with an embodiment of the invention.
Figure 4B:
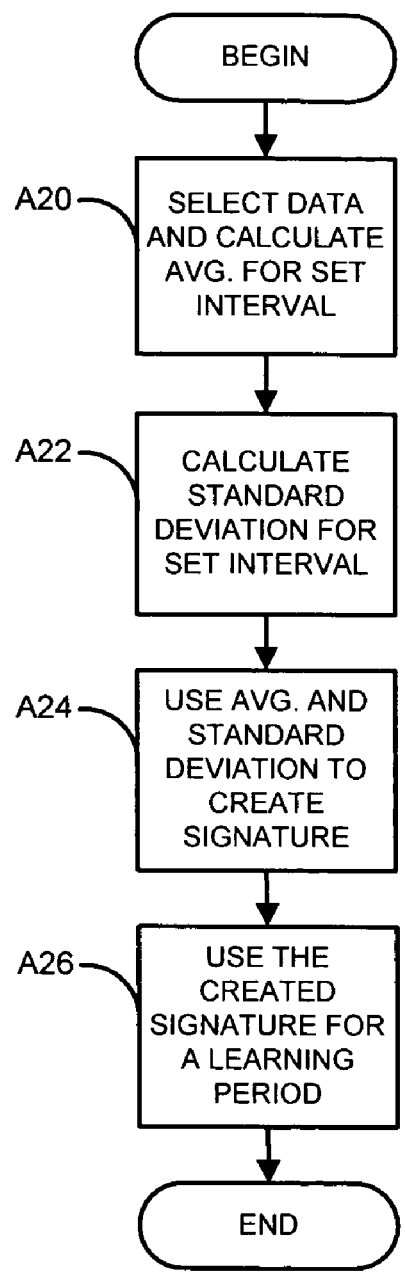
FIG. 4B is a flow chart illustrating further procedures involved in a method for creating a signature in accordance with an embodiment of the invention.

FIGS. 4A and 4B further illustrate creation of a signature performed in procedure A of FIG. 3. The creation of a signature is accomplished using two simultaneously applied methods. The two methods involve an accelerated learning component and a fake repeats component. FIG. 4A illustrates the accelerated learning component and FIG. 4B illustrates a fake repeats component.

FIG. 4A is a flow chart illustrating a component of a method for creating a signature in accordance with an embodiment of the invention. In step A10, the monitoring system 10 sets a learning responsiveness ratio. In step A12, the learning responsiveness ratio is decreased at a pre-set interval. If the desired value of the learning responsiveness ratio is reached in step A14, the process ends. If the desired value has not been reached, the learning responsiveness ratio is again decreased at the set interval in step 12. The process ends when the learning responsiveness ratio reaches a desired value. For example, during a first learning week when no previous signature is available, the monitoring system can set "1/Learning Responsiveness Constant" to 1. The data collected during the first week will then be used to create a signature. In the following week, the learning responsiveness ratio can be modified to control the impact of the newly collected data on the signature. In an embodiment, the monitoring responsiveness system can set the ratio to ½, then ¼, and so on until a desired set rate is reached. This process allows for rapid learning when insufficient history exists and reduces the impact of additional data as more data is incorporated into the signature. In other embodiments, other schedules or patterns can be used for adjusting the learning responsiveness ratio. When enough history is built, the ratio is adjusted to the desired target automatically.

FIG. 4B is a flow chart illustrating further procedures involved in a method for creating a signature in accordance with an embodiment of the invention. In step A20, the signature creation module 22 of the monitoring system 10 selects data and calculates an average data value for a set interval. In step A22, the signature creation module 22 calculates a standard deviation for the set interval. In step A24, the signature creation module 22 creates a signature using the calculated average and standard deviation. In step A26, the signature creation module 22 uses the created signature for a learning period.

Initially the running average and deviation are repeated throughout the signature for the day, after the first day, the signature for the day is repeated across the week, from then on, normal signature updates continue. During the first week, the signature will appear to approximate a straight band for a day, a daily repeated envelope the second day, and will take the form of a typical signature at the end of a week. The early signature may cause some false positives but will provide more accurate information as it evolves.

Figure 5:
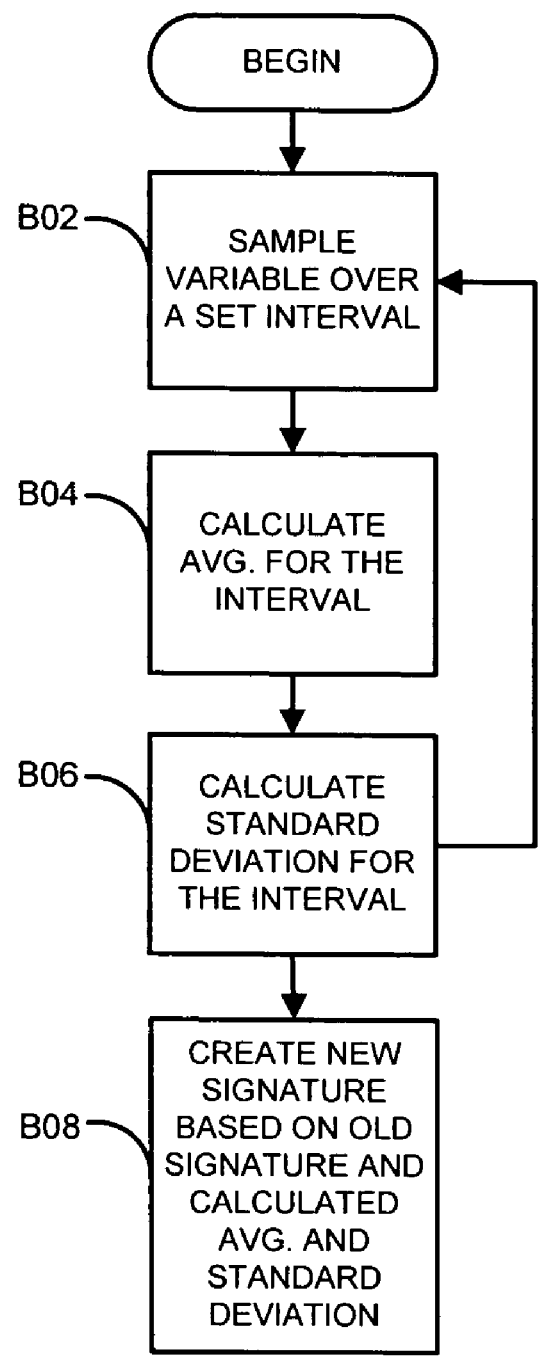
FIG. 5 is a flow chart illustrating a method for updating the signature in accordance with an embodiment of the invention.

FIG. 5 is a flow chart illustrating a method for updating the signature in accordance with an embodiment of the invention. In step B02, the signature updating module 24 samples the selected variable over a set interval. In step B04, the signature updating module 24 calculates an average for the set interval. In step B06, the signature updating module 24 calculates a standard deviation for the set interval. In step B08, the signature updating module 24 creates the new signature based on the old signature, the calculated average and the standard deviation.

The above-described process of learning over time takes into account variations in business volume over time. However, it is also necessary to ensure that certain times may be given more weight in certain situations than others. For example, a security brokerage experiences large volumes during what is known as "triple witching hour" that occurs on a Friday every three months. In another example, a recently opened store starts with a low business volume. However, for its first year as the word spreads, the store does more business. The signature should ensure that the latest data has more of an impact than the earlier data. Accordingly, the system should learn and adjust itself automatically over long periods of time.

The system accomplishes this goal by using weighted averages between current data and the values in the signature. If the average and standard deviation for Wednesday between 4 and 4:15 are $XC_{avg}$ and SigmaC respectively and the signature for 4-4:15 on Wednesday is $XS_{avg}$ and SigmaS, the new signature value may be expressed as follows:

$$\text{New } XS_{avg} = W1*(XS_{avg}) + W2*(XC_{avg}) \tag{3}$$

$$\text{New SigmaS}^2 = W1*(\text{SigmaS}^2 + XS_{avg}^2) + W2(\text{SigmaC}^2 + XC_{avg}^2) - (\text{New } XS_{avg}^2) \tag{4}$$

The model sets W1+W2=1 where W1 is the weight of the signature and W2 is the weight of current data. W2/W1 is the learning responsiveness constant ratio described above. The larger the value, the faster learning occurs and the dimmer the memory of the past becomes. For example, if W1=$\frac{2}{3}$ and W2=$\frac{1}{3}$, the impact of today's data will be $\frac{1}{3}^{rd}$ today, $\frac{2}{9}^{th}$ next week and $\frac{4}{27}^{th}$ the week after and so on.

The above-described technique is computationally very efficient since it allows updating of the signature using only the current data. The system does not require retaining large amounts of old data.

Figure 6:
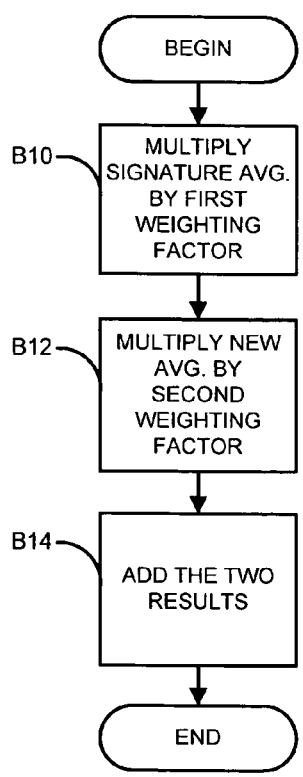
FIG. 6 is a flow chart illustrating a method for obtaining a signature component in accordance with an embodiment of the invention.

FIG. 6 is a flow chart illustrating the method described above for obtaining a signature component in accordance with an embodiment of the invention. In step B10, the monitoring system 10 multiplies a signature average by a first weighting factor. In step B12, the monitoring system multiples the newly calculated average by a second weighting factor. In step B14, the monitoring system 10 adds the results from step B12 and step B10.

Figure 7:
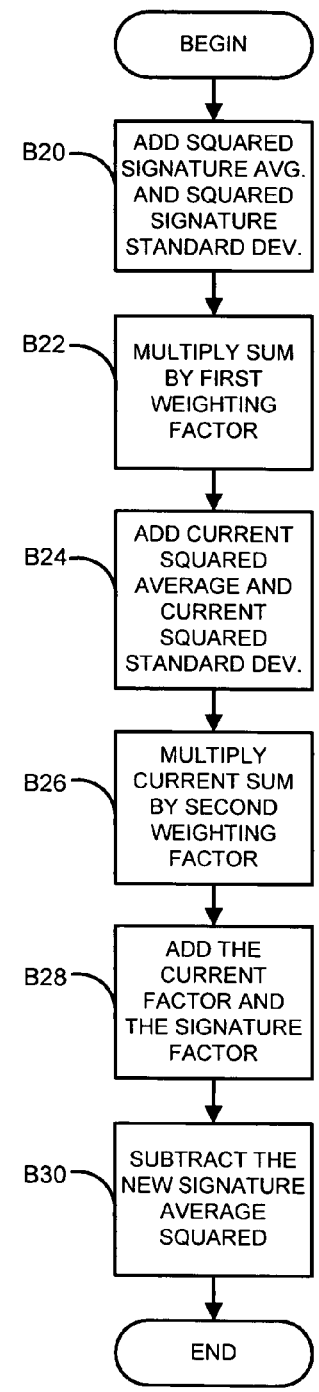
FIG. 7 is a flow chart illustrating a method for obtaining another signature component in accordance with an embodiment of the invention.

FIG. 7 is a flow chart illustrating a method for obtaining another signature component in accordance with an embodiment of the invention. In step B20, the monitoring system adds the squared signature average and squared standard deviation. In step B22, the monitoring system 10 multiplies the sum of step B20 by a first weighting factor. In step B22, the monitoring system 10 adds the current squared average and the current squared standard deviation. In step B26, the monitoring system multiples the sum of B24 by a second weighting factor. In step B28, the monitoring system adds the factor from step B24 and the signature factor. In step B20, the monitoring system subtracts the square of the new signature average.

The above-described factors help to fine-tune the signature to account for variations in amplitude. Other features can be provided to ensure that the signature is able to accurately reflect variations in occurrence times. Events often happen earlier or later than expected. For instance, if a snowstorm delays all arrivals by half an hour, an excessive number of alerts may be registered. The system resolves this problem by computing moving averages and deviations over an interval of time and comparing against the same on the signature calculated over even a broader interval that straddles the current interval.

For example, if the system is sampling data every 3 minutes, at 4:15, it may compute the moving average for the past 10 samples (from 3:45 to 4:15) and compare against the signature value at 4:30 computed over 20 samples (computed from 3:30 to 4:30). In this manner, only discrepancies that are present and persisting will get flagged, while any shift in time back or forth within the interval does not give false positives. Two constants, jitter spread and jitter offset, are introduced as controls. In this case the spread is thirty minutes and the offset is fifteen minutes. The time tolerance in this case may be selected as one hour (jitter spread+two times offset). Accordingly, a large spike that comes half an hour earlier or later than expected by the signature does not cause a false positive abnormality. In strictly regimented businesses, the time tolerance can be tightened.

Figure 8:
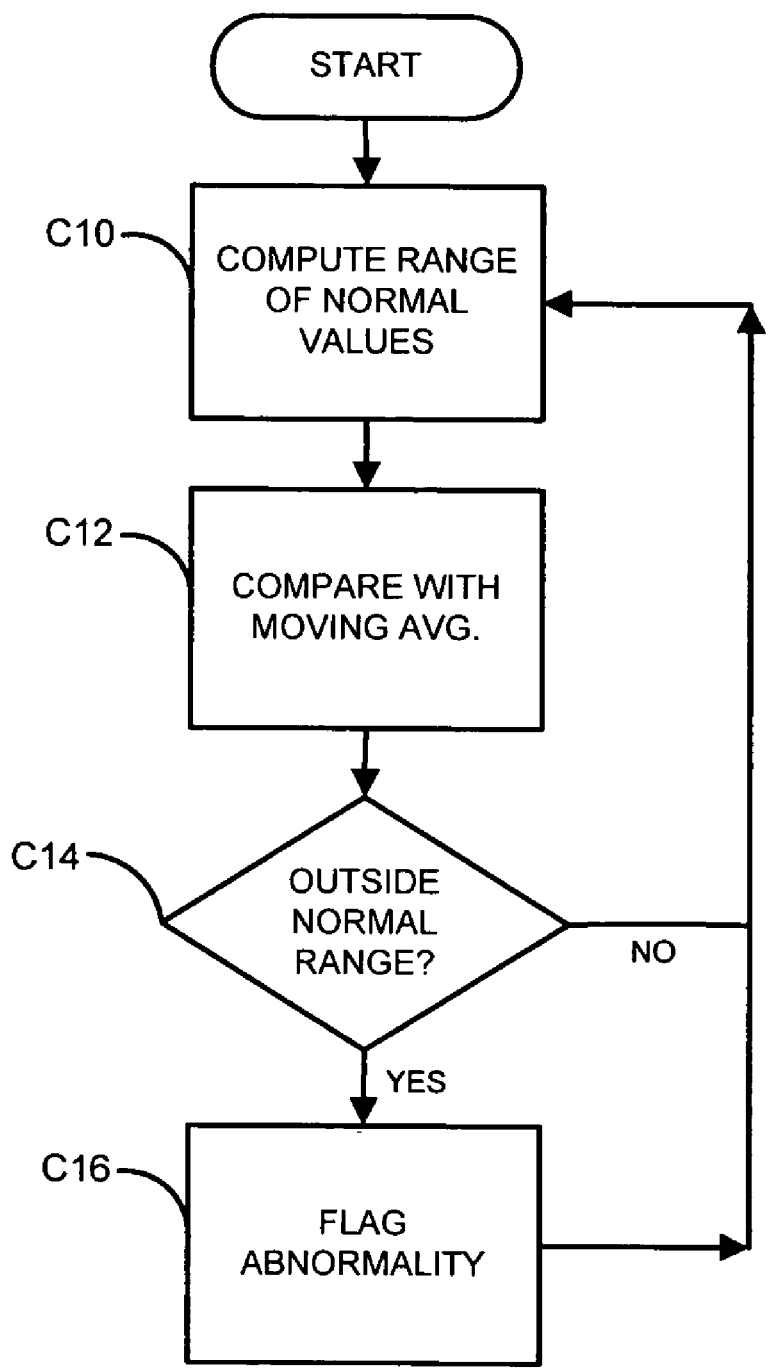
FIG. 8 is a flow chart illustrating a method for detecting abnormalities in accordance with an embodiment of the invention.

FIG. 8 is a flow chart illustrating a method for detecting abnormalities in accordance with an embodiment of the invention. In step C10, the abnormality detection module 26 computes a range of normal values. In step C12, the abnormality detection module 26 compares the computed range with a moving average. In step C14, the abnormality detection module determines if the moving average is outside the normal range. If the average is outside the normal range in step C14, the abnormality detection module 26 flags the abnormality and the process repeats. If the average is not outside the normal range in step C14, the process repeats.

Normalcy and abnormalities are subjective. Customers want an attenuation control that flags abnormal values only up to the level that the customers have a capacity to handle. As proactive and learned monitoring succeeds, customers can divert more administrative resources from correcting existing abnormalities to proactive monitoring.

The system and method of the invention can statistically guarantee customers the alerts they want over time. For instance, an installation with a 1000 computers, with 100 counters sampled every 15 minutes has approximately 10,000,000 (10 million) opportunities for alerts a day. If a customer wants to limit alerts to 100 per day, the customer needs to set the tolerance F accordingly.

Some customers might prefer multiple envelopes using F1, F2, and F3 for different envelopes such as informational, warning, and critical. Some others might choose to have different overshoot and undershoot envelopes.

The raw variables produced by most instrumentation have their own idiosyncrasies. The idiosyncrasies fall in the following three categories: (1) running counter with rollover; (2) bursty sampled data; and (3) monotonically increasing/decreasing absolute data.

In the first case of running count with rollover, the counters will only provide a running count. The consumer of the data is expected to take two snapshots over time, and compute the difference and rate. The computation gets a bit complex since the counter can rollover from the largest number back to zero.

In the second case of bursty sampled data, collected data is extremely spiky. The only way to use the data is to compute an area under the curve between fixed time periods.

In the case of monotonically increasing or decreasing absolute data, some variables tend to increase or decrease constantly such that weekly business cycles lose meaning. In this case, preprocessing should report rate of change over time, for example, in order to detect if a runaway program is suddenly filling up disk space.

Based on the aforementioned variables and methods, a signature model is described by equations 5 and 6.

$$\text{New}XS(t)=(L/1+L)*XS(t)+(1/1+L)*(XC_{movingavg}(t, \text{TimeTolerance})) \quad (5)$$

$$(\text{NewSigma}S(t))^2=(L/1+L)*(\text{Sigma}S(t)^2+XS(t)^2)+(1/1+L)*((\text{Sigma}C(t,\text{TimeTolerance}))^2+(XC_{movingavg}(t,\text{TimeTolerance}))^2)-\text{New}XS(t)^2 \quad (6)$$

In the signature provided above, XC(t) is a time variant numeric variable. XS(t) and SigmaS(t) are the two components of the precomputed signature for the variable XC(t). $XC_{movingavg}$ (t, deltaT) is the moving average of XC(t) taken over the period between t-deltaT and t. SigmaC (t, deltaT) is the standard deviation over the period t-deltaT and t for XC(t). 1/L is the learning responsiveness ratio as described above.

Abnormalities are calculated based on the following equations related to the signature. XC(t) is abnormal if:

$$XC_{movingavg}(t,\text{jitterspread})<[XS(t+\text{jitteroffset})-F*\text{Sigma}S(t+\text{jitteroffset})] \quad (7)$$

OR $$XC_{movingavg}(t,\text{jitterspread})>[XS(t+\text{jitteroffset})+F*\text{Sigma}S(t+\text{jitteroffset})] \quad (8)$$

The first violation as described by equation (7) is called an undershoot and the second violation as described by equation (8) is called an overshoot. Jitterspread is the jitter spread as described above and Jitteroffset is the jitter offset as described above.

TimeTolerance is equal to (2*Jitteroffset+Jitterspread) and F is the tolerance.

Figure 9A:
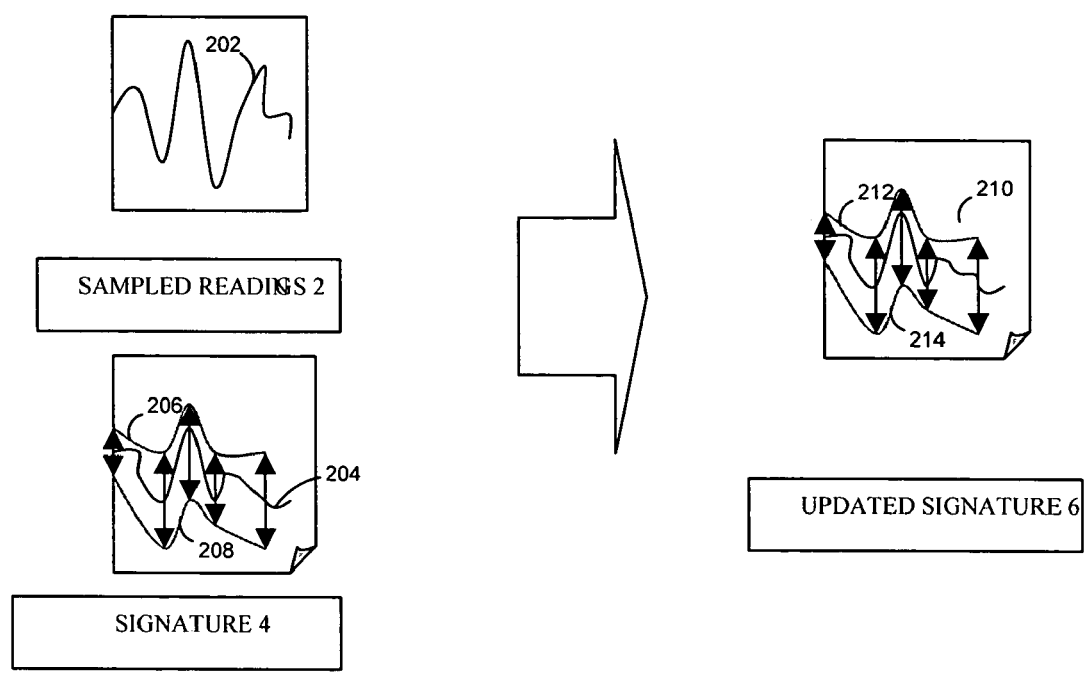
FIG. 9A includes an illustration of the signature updating process.

FIG. 9A provides an illustration of the signature updating process. FIG. 9A includes sample readings 2. The sampled readings 2 include a curve 202 representing the sampled values XC(t). FIG. 9A also includes a signature 4. The middle curve 204 represents XS(t), the average signature value. The upper curve 206 represents the uppermost normal values and the lower curve 208 represents the lowermost normal values. FIG. 9A also includes an update signature 6. The updated signature 6 includes a curve 210 representing XS(t) after consideration of the sampled values XS(t) and the upper normal limit represented by the curve 212, and the lower normal limit represented by the curve 214.

Figure 9B:
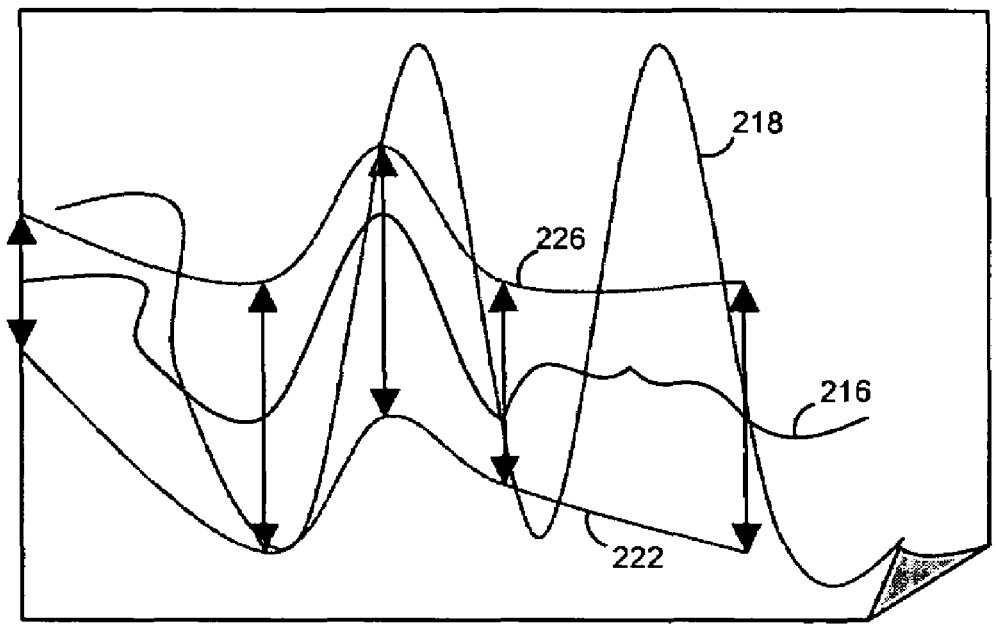
FIG. 9B illustrates a previously computed signature compared with a sample signal.

FIG. 9B illustrates a previously computed signal 216 compared with a sample signal 218. The sample signal 218 exceeds the upper normal limit 220 at two points and the lower normal limit 222 at point. As shown, the comparison helps to identify overshoots and undershoots.

The above description provides embodiments of systems and methods for creation and use of signatures for monitoring the activity of a computer system. Those of skill in the art will recognize that the signature creation and comparison algorithms provided above are exemplary, and that other mathematical formulations for signature creation and comparison can be used in other embodiments of the invention.

IV. Auxiliary Data Sets and Data Sources

In some embodiments, the effectiveness of a signature for detecting abnormalities will improve over time. The techniques described above provide several embodiments for improving the performance of a signature when only a limited data set is available; however, an improvement in effectiveness over time can still occur for a variety of reasons. For example, when a signature is first created for a system, only a limited amount of data is available to form the signature. In another example, if a system undergoes a major change in configuration or usage, the current signature may not be an effective indicator of desired performance. In such embodiments, an auxiliary signature can be associated with a measured value to improve abnormality detection.

A. Definitions

In various embodiments, a signature can be created based on measured values collected from one or more computer systems. Note that a computer system can be a networked system including multiple processors and/or computers. A signature created using a native data source is defined as a signature associated with a measured value on a computer system that is created using one or more measured values collected on the same computer system. A signature created using an auxiliary data source is defined as a signature associated with a measured value on a first computer system but that is created using measured values collected on a second computer system. One type of signature created using an auxiliary data source is an aggregated signature, where measured values collected from two or more computer systems are combined to form a single signature. The aggregated signature can then be used by a computer system for detecting abnormalities. Note that the computer system using the aggregated signature does not have to be one of the computer systems that data was collected from in order to form the aggregated signature.

In various embodiments, creation of a signature can be carried out by a signature creation system. An example of a signature creation system is the Microsoft Operation Manager. In an embodiment where Microsoft Operation Manager is used to create a signature, the signature can be based on data collected by the same instance of Microsoft Operation Manager, or possibly by another instance such as an instance running on a separate computer system. In such an embodiment, the same type of signature creation system is used both to collect the data and to form the signature. This type of signature is defined as a signature created using a native data set. On the other hand, if at least a portion of the data used to form the signature is data collected by another type of system, such as another signature creation system or any other type of system capable of data collection, the signature is defined as a signature created using an auxiliary data set.

An auxiliary signature is defined as a signature associated with a measurable value that is created or formed using an auxiliary data set and/or using data collected from an auxiliary data source.

B. Signatures Created Using an Auxiliary Data Set

In an embodiment, one method for providing an auxiliary signature is to form or create an auxiliary signature using an auxiliary data set. Use of an auxiliary data set allows for creation of a signature on a computer system using a native data source even though the signature creation system that is forming the signature has not collected performance and/or event data. The auxiliary data set can be formed using any data collected for the computer system. Auxiliary data sets can include data collected by monitoring programs, security programs, system utilities for a computer system (such as PERFMON), or any other system or program that records performance or event data. The data can be in the form of a database, a logfile, a text file, or any other convenient format. In an embodiment, the auxiliary data set may require transformation into a format that can be read by the signature creation system.

In an embodiment, a signature can be created or formed using an auxiliary data set by calculating a signature according to the methods described above. Preferably, the creation of the signature using the auxiliary data set is similar to creation of a signature using a native data set, except that a series of stored values are used rather than collecting measured data in real time for incorporation into the signature. After creating a signature, the signature is associated with the corresponding measurable value. In such an embodiment, the auxiliary data set preferably contains a series of measured values for one or more performance or event variables, as well as a measurement time for each value. The periodicity and sampling rate of the auxiliary data set can be specified if known, or the periodicity and sampling rate can be determined from the data.

In another embodiment, the periodicity and/or sampling rate of the auxiliary data set may be different from the desired periodicity and/or sampling rate for the signature. In such an embodiment, the signature can be calculated using the periodicity and sampling rate of the auxiliary data set. The time intervals in the signature can then be adjusted to match the desired periodicity and sampling rate for the computer system. For example, an auxiliary data set may have only collected data for 30 minute intervals during the course of a week. If 15 minute intervals are desired for the computer system, an initial signature can be calculated using the auxiliary data set. The number of time periods can then be doubled, so that each 30 minute period during a week becomes two 15 minute periods. Future updates to the signature can then be calculated using the desired 15 minute intervals.

Note that once a signature is formed from an auxiliary data set, the signature can be updated with additional measured values. This would result in a signature that is based on an aggregated data set that includes both an auxiliary data set as well as a native data set. Similarly, a signature created using an auxiliary data source can also be updated using data from a native data source.

C. Signatures Created Using an Auxiliary Data Source

In an embodiment, data collected from a first computer system can be used as some or all of the data for forming a signature on a second computer system. In such an embodiment, the resulting signature is referred to as a signature based on an auxiliary data source. For example, a signature based on an auxiliary data source can be calculated at a first computer and then received by a second computer for use. Alternatively, the first computer can provide a data set to a second computer. The second computer can receive the data and calculate a signature. In either situation, the signature based on the auxiliary data source can then be associated with a measured value.

In an embodiment, the difference between creating the signature using the auxiliary data source is that a series of stored values is used to create the signature, rather than collecting measured values in real time for incorporation into a signature. In such an embodiment, the data from the auxiliary data source preferably contains a series of measured values for one or more performance or event variables, as well as a measurement time for each value. The periodicity and sampling rate of the data from the auxiliary data source can be specified if known, or the periodicity and sampling rate can be determined from the data.

In another embodiment, the performance and event data collected from a first computer system (the auxiliary data source) can differ from the desired measured values that are to be collected from the second computer system. For example, the system configuration of the two computer systems may differ, such as one system having additional processors. This could lead to a difference in the number of measured values related to CPU utilization between the two systems. In another example, the computer systems could differ in the desired number of measured values to be monitored. For example, the first computer system may have a counter indicating the number of completed sales transactions processed by the first computer system during a time period. On the second computer, there may be no desire to track the number of completed sales transactions, but instead it may be desirable to monitor the number of requests for a specific web page during a time period.

In embodiments where the measured values collected or tracked for the auxiliary data source do not have a one to one correspondence with the desired measured values for the signature, the mismatch can be handled by any convenient method. For example, a signature created based on a measured value collected at the auxiliary data source can be associated with a similar measured value on the second computer system. Alternatively, one or more measured values collected for the auxiliary data source can be mathematically manipulated, such as by averaging, and a signature can be calculated based on the mathematically manipulated value. This signature can then be associated with a desired variable on the second computer. In still another embodiment, a measured value collected for the auxiliary data source can be ignored entirely.

In still another embodiment, data from a plurality of sources can be used to create an aggregated signature. In such an embodiment, measured values from the plurality of sources can be combined in any convenient manner to create the aggregated signature. For example, a measured value from each data source for a given time interval can be averaged in order to produce a single combined value. This combined value can then be used as part of a signature creation algorithm as described above.

Preferably, the number and type of measured values collected for each data source are the same. If there is a difference in the number or type of measured values collected for one or more of the data sources, the mismatch in variables can be handled as described above, such as by identifying corresponding variables, calculating a signature for a mathematically manipulated variable, or ignoring a variable. Similarly, any mismatch in variables between the aggregated signature and the desired variables for a computer system can be addressed by the techniques described above.

V. Using Dimensions to Analyze Abnormalities

In an embodiment, when data for a measured value is obtained, additional dimensional information can also be collected and associated with the measured value. Dimensional information refers to additional information that can be used to further distinguish or categorize collected data. In an embodiment, a possible measured value for measurement on a computer system could be the number of purchase transactions completed using the system. A number of possible dimensions could be tracked to further characterize this measured value. For example, a business with both brick and mortar stores as well as a web site could track a dimension of purchases made in a physical store versus purchases made via a web portal. A chain of bookstores with varied products could track a dimension distinguishing between book purchases, music purchases, and food/beverage purchases. A more specific dimension could track whether book purchases represent mystery books, science fiction books, reference books, and self-improvement books. Still another dimension could be used to track the location of purchases. In an example not related to web transactions, login or other authorization failures on a computer system could be tracked based on the user location, either using an IP address, or possibly just distinguishing between authorization failures at the company site versus failures generated during a remote access attempt. More generally, any information that can be gathered regarding a measured value as it is measured can be used as the basis for a dimension to further characterize the measured value.

In a preferred embodiment, dimension information can be used to respond to queries about the performance of a measured variable. In such an embodiment, if a measured value is indicated as abnormal relative to the signature, a user interface can be provided to allow a user to query one or more associated dimensions. In an example for a chain of 5 bookstores with varied products, the signature for purchase transactions between 7 and 9 AM on a Tuesday may indicate an average purchase volume of 1000 purchases, with an expected variation of 150. In this example, an abnormality is detected showing a purchase volume of 1900 purchases during the time period. Using the dimensional data, a user can determine that 1 of the 5 bookstores has a purchase volume of 1100 all by itself, and that half of the purchases are books. The remaining stores have 200 purchases each, with almost all of the purchases being food/beverage. Based on this data, the user can correlate the abnormality in purchases with a scheduled book signing event at the store with the high purchase volume.

VI. Increased Data Collection Techniques

In an embodiment, an abnormality (or other predefined event) can be used to trigger additional data collection and/or creation of signatures for additional measured values in a computer system. In such an embodiment, a first group of variables are being monitored and having their signatures updated. When an abnormality or another trigger event is detected for one of the measured values, additional data collection is started. One type of additional data is data collected to increase the granularity of the collected data. For example, the variables in the first group of measured values can represent quantities that are measured every 3 minutes, and then aggregated to determine an average over a 15 minute interval. When a trigger event occurs, the rate of data collection for a measured value associated with the trigger event can be increased to so that it is measured every 10 seconds, and then aggregated over a 1 minute interval. The rate of data collection can similarly be increased for one or more other measured values, such as other correlated values, or even all measured values in the first group.

Another type of increased data collection can be due to an increase in the number of measured values that are monitored. For example, when a trigger event occurs for a measured value in the first group, a second group of measured values can be selected for data collection. The second group of measured values could represent values that are only of interest during an abnormality, values are only meaningful on a reduced time scale, or values that are not normally tracked for another reason, such as a desire to limit the amount of data collected. Preferably, the second group of measured values is selected based on a correlation with the measured value for which the abnormality was detected. This second group of measured values is then monitored until a condition is met. The condition could be passage of a certain amount of time, the elimination of the triggering event, or another reason such as a user disabling the additional data collection.

The additional data collection can be used to construct a signature that can be associated with one or more of the variables involved in the additional data collection. In an embodiment, the signature can be a signature for tracking a short time interval associated with the additional data collection. For example, if collected data is being aggregated over 1 minute intervals, a 1 minute interval signature can be created. This signature can be used to evaluate each consecutive 1 minute interval to evaluate changes in the behavior of a measured value.

In another embodiment, the additional data can be used to identify the root cause of the abnormality. In such an embodiment, one or more of the measured values involved in the additional data collection can be analyzed for specific types of behavior. The analyzed measured values can be compared to pre-defined behavior patterns in order to identify a potential cause for the abnormality.

VII. Additional Visualization and Abnormality Detection Features

Additional abnormality detection features can be used to supplement the abnormality detection system and methods described above. In an embodiment, the signature creation and updating method can include a maintenance mode. A maintenance mode period represents a time period where abnormal behavior of the system is expected for any reason. During a maintenance mode period, signatures are not updated and no alerts are created based on abnormalities in the value of a measured value. This avoids inclusion of data within the signature that is known to be non-representative of the system. In another embodiment, an exception period can be specified. During an exception period, alerts are also not created, but data is still collected for measured values and used to update the corresponding signature. For example, an exception period could be created to correspond to a public holiday, when system performance is expected to deviate greatly from a typical work day. Creating an exception period allows the signature creation system to collect data for about a specified period, so that a signature could be created in the future, while avoiding updates of the current signature. A maintenance mode time period or an exception period can be specified for any convenient length of time, such as a single sampling period or a multi-day period.

Figure 10:
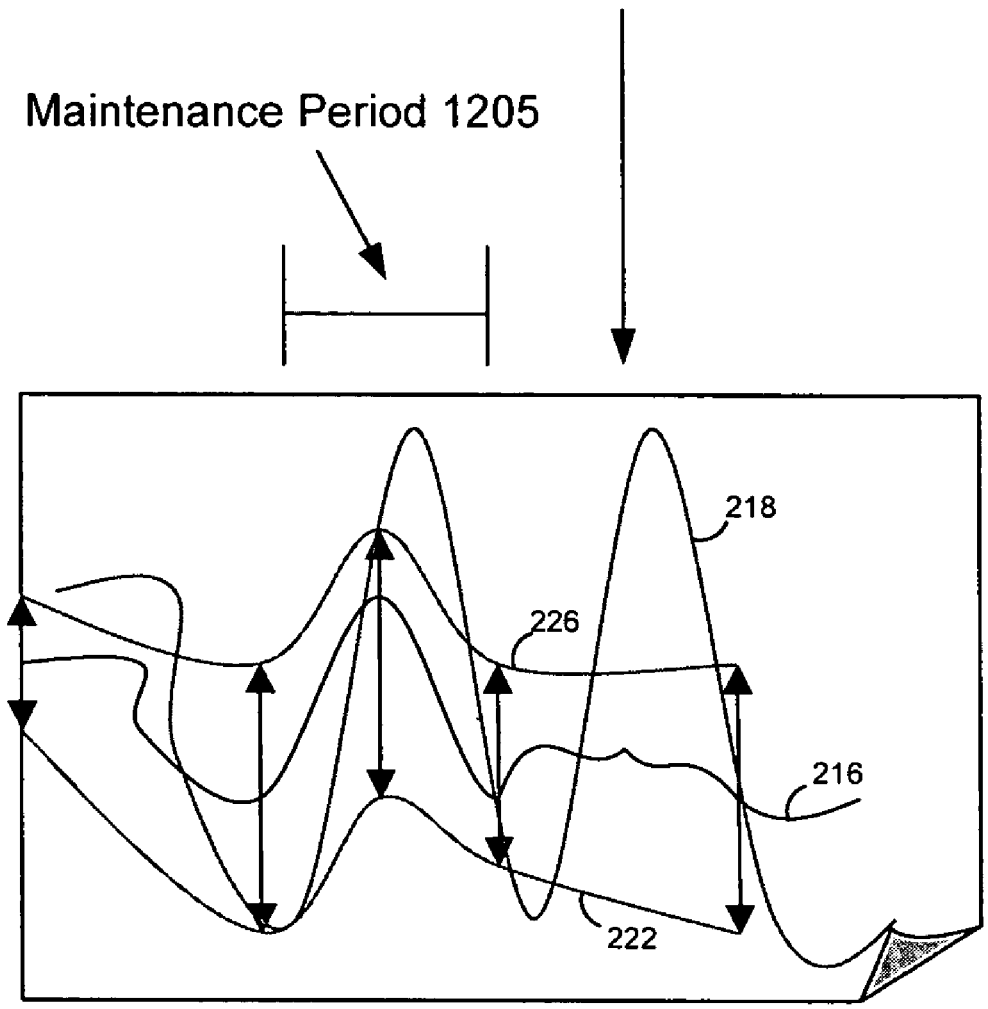
FIG. 10 illustrates comparison of a signature with a sample signal during different modes of operation of an embodiment of the invention.

FIG. 10 shows the same signature and measured data as FIG. 9B, but additional data is included. In FIG. 10, a maintenance mode period 1205 is indicated that corresponds to the first location where measured value 218 exceeds the boundary defined by envelope 226. In a graphical user display, such a maintenance mode period could be displayed as a range as in FIG. 10, a transparent overlay bar could be placed over the time period of the maintenance mode in the data, or another convenient display technique could be used to indicate the time period. Note that the designation of the maintenance mode period results in an alert not being created for the first abnormality shown in FIG. 10. By contrast, an alert 1215 is created for the second abnormality shown in FIG. 10.

Figure 11:
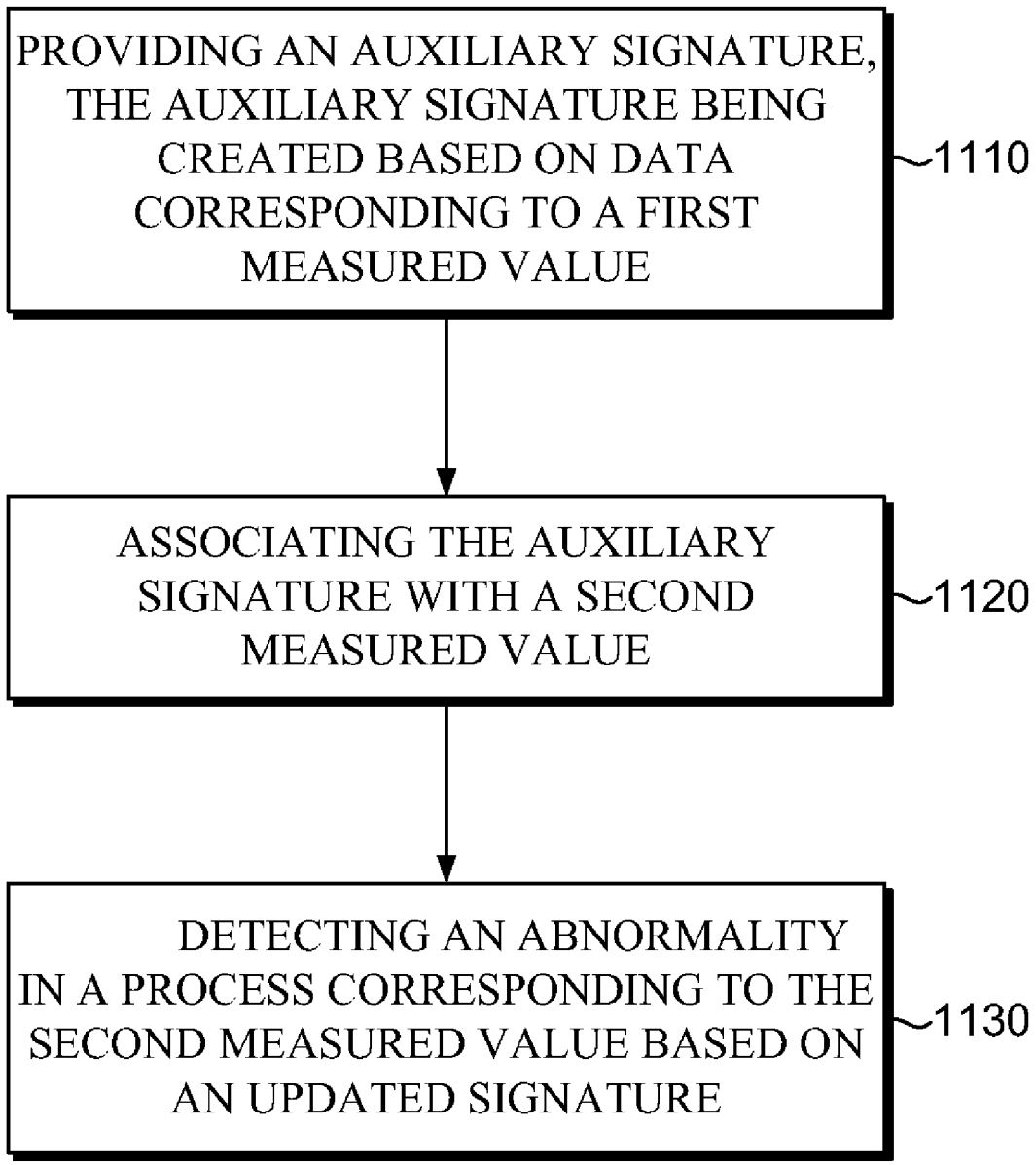
FIG. 11 is a flow chart illustrating a method for monitoring a process in accordance with an embodiment of the present invention.

FIG. 11 discloses a method in accordance with an embodiment of the present invention. Block 1110 includes providing an auxiliary signature, the auxiliary signature being created based on data conesponding to a first measured value. Block 1120 includes associating the auxiliary signature with a second measured value. Block 1130 includes detecting an abnormality in a process corresponding to the second measured value based on the updated signature.

Figure 12:
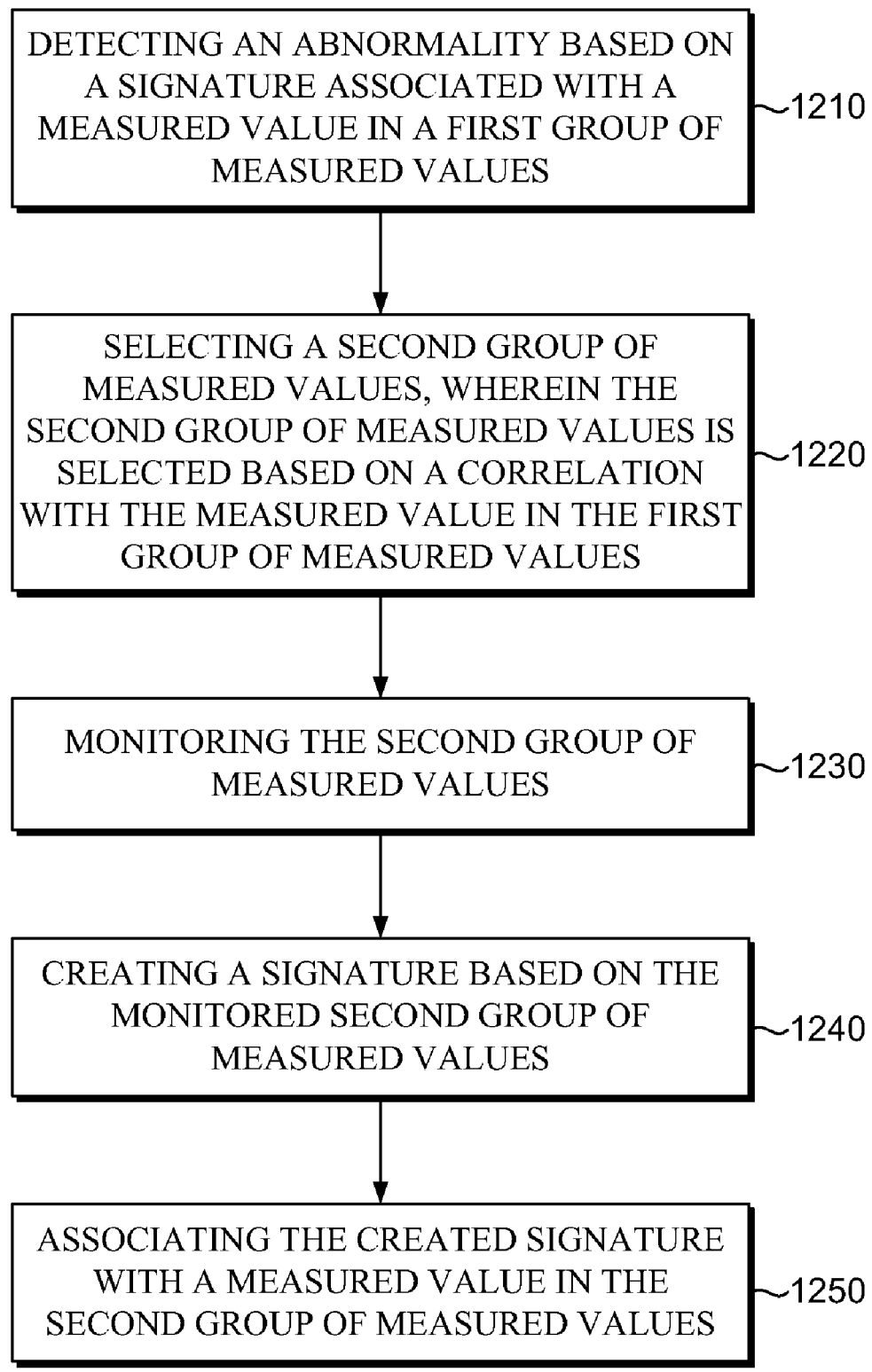
FIG. 12 is a flow chart illustrating a method for monitoring a process based on a measured value in accordance with an embodiment of the present invention.

FIG. 12 discloses a method for monitoring a process based on a measured value in accordance with an embodiment of the present invention. Block 1210 includes detecting an abnormality based on a signature associated with a measured value in a first group of measured values. Block 1220 includes selecting a second group of measured values. The second group of measured values is selected based on a correlation with the measured value in the first group of measured values. Block 1230 includes monitoring the second group of measured values. Block 1240 includes creating a signature based on the monitored second group of measured values. Block 1250 includes associating the created signature with a measured value in the second group of measured values.

Figure 13:
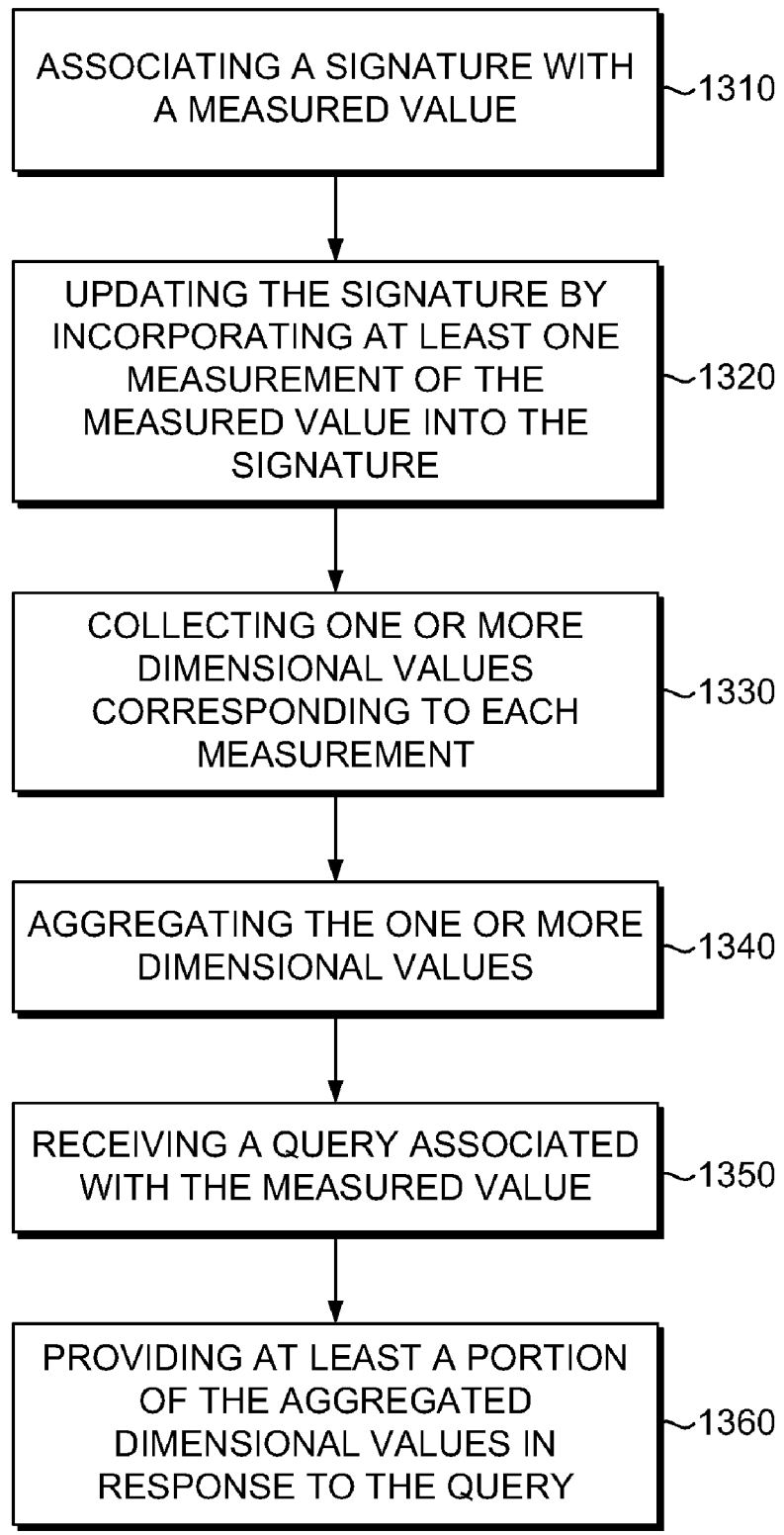
FIG. 13 is a flow chart illustrating a method for monitoring a process corresponding to a measured value in accordance with an embodiment of the present invention.

FIG. 13 discloses a method in accordance with an embodiment of the present invention. Block 1310 includes associating a signature with a measured value. Block 1320 includes updating the signature by incorporating at least one measurement of the measured value into the signature. Block 1330 includes collecting one or more dimensional values corresponding to each measurement. Block 1340 includes aggregating the one or more dimensional values. Block 1350 includes receiving a query associated with the measured value. Block 1360 includes providing at least a portion of the aggregated dimensional values in response to the query.

In another embodiment, a graphical user interface can display multiple signatures (and data for corresponding measured values) in a single graphical display. In such an embodiment, each displayed measured value and signature can be identified separately, such as by displaying each signature envelope in a different color. When multiple signatures are displayed in a single graph, any maintenance mode periods or exception periods can be displayed by indicating the specific signature that the maintenance or exception period applies to. In an embodiment, 2 or more signatures can be visualized at the same time, or 3 or more signatures, or 4 or more signatures, or 5 or more signatures.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method performed by one or more computer systems, the computer-implemented method comprising:
   providing an auxiliary signature, the auxiliary signature being provided by a first computer system and created based on data corresponding to a first measured value;
   associating the auxiliary signature with a second measured value; and
   detecting an abnormality in a process corresponding to the second measured value based on an updated signature.

2. The method of claim 1, further comprising:
   updating the auxiliary signature based on data corresponding to the second measured value.

3. The method of claim 1, wherein the data corresponding to the first measured value comprises an auxiliary data set.

4. The method of claim 1, wherein the data corresponding to the first measured value comprises data from an auxiliary data source.

5. The method of claim 1, wherein the provided auxiliary signature is created based on a mathematical manipulation of the first measured value.

6. The method of claim 5, wherein the mathematical manipulation of the first measured value comprises averaging the first measured value with one or more additional measured values.

7. The method of claim 1, wherein the auxiliary signature comprises an aggregated signature.

8. The method of claim 1, further comprising selecting a group of measured values correlated with the second measured value, and monitoring the selected group of measured values.

9. The method of claim 1, wherein providing an auxiliary signature comprises:
   receiving a data set corresponding to the first measured value, and
   creating the auxiliary signature.

10. The method of claim 1, wherein providing an auxiliary signature comprises receiving a plurality of auxiliary signatures corresponding to a plurality of measured values.

11. The method of claim 10, wherein the plurality of auxiliary signatures are received from a second computer system by the first computer system, and wherein at least one received auxiliary signature is not correlated with a measured value on the second computer system.

12. One or more computer-readable storage media having computer-useable instructions embodied thereon to execute a computer-implemented method for performing a method for monitoring a process based on a measured value, comprising:
   detecting an abnormality based on a signature associated with a measured value in a first group of measured values, wherein a first computer detects the abnormality based on a signature associated with a measured value in a first group of measured values;
   selecting a second group of measured values, wherein the second group of measured values is selected based on a correlation with the measured value in the first group of measured values;
   monitoring the second group of measured values;
   creating a signature based on the monitored second group of measured values; and
   associating the created signature with a measured value in the second group of measured values.

13. The media of claim 12, wherein the measured value in the first group of measured values is aggregated over a time period, the method further comprising reducing the time period based on the detection of the abnormality.

14. The media of claim 12, wherein the signature associated with the measured value in the first group of measured values is an auxiliary signature.

15. A computer-implemented method performed by at least one computer system comprising:
   associating a signature with a measured value;
   updating the signature by incorporating at least one measurement of the measured value into the signature;
   collecting one or more dimensional values corresponding to each measurement;
   aggregating the one or more dimensional values;
   receiving a query associated with the measured value; and
   providing at least a portion of the aggregated dimensional values in response to the query, wherein a first computer provides at least a portion of the aggregated dimensional values in response to the query.

16. The method of claim 15, wherein the associated signature is an auxiliary signature.

17. The method of claim 15, wherein associating a signature with a measured value comprises:
   receiving a data set from an auxiliary data source;
   creating a signature based on the received data set; and
   associating the created signature with the measured value.

18. The method of claim 15, further comprising detecting an abnormality in the process corresponding to the measured value based on the updated signature.

19. The method of claim 18, wherein the received query is associated with the detected abnormality.

* * * * *